(12) United States Patent
Newman

(10) Patent No.: US 11,301,656 B2
(45) Date of Patent: Apr. 12, 2022

(54) CLOTHING HAVING ONE OR MORE PRINTED AREAS DISGUISING A SHAPE OR A SIZE OF A BIOLOGICAL FEATURE

(71) Applicant: PROHIBITION X PTE LTD, Singapore (SG)

(72) Inventor: David Liam Newman, Adelaide (AU)

(73) Assignee: PROHIBITION X PTE LTD, Singapore (SG)

( * ) Notice: Subject to any disclaimer, the term of this patent is extended or adjusted under 35 U.S.C. 154(b) by 0 days.

(21) Appl. No.: 16/563,428

(22) Filed: Sep. 6, 2019

(65) Prior Publication Data
US 2020/0082138 A1 Mar. 12, 2020

Related U.S. Application Data

(60) Provisional application No. 62/727,902, filed on Sep. 6, 2018.

(51) Int. Cl.
*G06K 7/10* (2006.01)
*G06K 9/00* (2006.01)
(Continued)

(52) U.S. Cl.
CPC ......... *G06K 7/10722* (2013.01); *A41D 1/002* (2013.01); *F41H 3/02* (2013.01);
(Continued)

(58) Field of Classification Search
CPC ............. G06K 7/10722; G06K 7/1417; G06K 9/00369; G06K 9/6202; G06T 7/248; G06T 19/00; A41D 1/002
See application file for complete search history.

(56) References Cited

U.S. PATENT DOCUMENTS 9,949,697 B2 4/2018 Iscoe et al.
10,664,903 B1* 5/2020 Haitani ............... G02B 27/017
(Continued)

FOREIGN PATENT DOCUMENTS

| CN | 102646245 A | 8/2012 |
| KR | 101822571 B1 | 1/2018 |
| WO | 2016097732 A1 | 6/2016 |

OTHER PUBLICATIONS

Lenore Edman, "Dazzel Camouflage in Fashion"; Mar. 18, 2013 (Year: 2013).*

(Continued)

*Primary Examiner* — Laura A Gudorf
(74) *Attorney, Agent, or Firm* — Dorsey & Whitney LLP

(57) ABSTRACT

A custom clothing system operable on a computing device of a user. The custom clothing system can utilize input from the user and images of the user to generate an avatar which accurately depicts the anthropometry measurements of the user. The custom clothing system can modify clothing to include a non-repeating print which disguises a biological feature of the user. The custom clothing system can track the movements and location of the user by reading a machine-readable non-repeating print coupled to an article of clothing worn by the user. The custom clothing system can modify an article of clothing to include one or more support members configured to support a user's injury.

12 Claims, 12 Drawing Sheets

(51) Int. Cl.
  *G06K 9/62* (2006.01)
  *G06T 19/00* (2011.01)
  *G06K 7/14* (2006.01)
  *G06Q 10/08* (2012.01)
  *F41H 3/02* (2006.01)
  *A41D 1/00* (2018.01)
  *G06T 7/246* (2017.01)

(52) U.S. Cl.
  CPC ....... *G06K 7/1417* (2013.01); *G06K 9/00369* (2013.01); *G06K 9/6202* (2013.01); *G06Q 10/083* (2013.01); *G06T 7/248* (2017.01); *G06T 19/00* (2013.01); *G06T 2207/30196* (2013.01)

(56) References Cited

U.S. PATENT DOCUMENTS

| | | | |
|---|---|---|---|
| 2005/0268371 A1* | 12/2005 | Meekins | A41D 27/08 2/69 |
| 2011/0298897 A1 | 12/2011 | Sareen et al. | |
| 2015/0051994 A1* | 2/2015 | Ward | G06Q 30/0639 705/23 |
| 2015/0154691 A1 | 6/2015 | Curry et al. | |
| 2016/0227854 A1* | 8/2016 | Ellis | G06T 3/005 |
| 2016/0292770 A1* | 10/2016 | Alselimi | G06Q 30/0631 |
| 2017/0124747 A1* | 5/2017 | Knowlton | A41H 3/007 |
| 2018/0020752 A1* | 1/2018 | Peshek | A41D 1/14 2/67 |
| 2019/0015046 A1* | 1/2019 | Whitehouse | G16H 40/67 |
| 2019/0019228 A1* | 1/2019 | Reddy | G06Q 30/0224 |
| 2019/0110916 A1* | 4/2019 | Higgins | A61F 13/06 |
| 2019/0325279 A1* | 10/2019 | Wang | G06K 19/06037 |

OTHER PUBLICATIONS

International Search Report and Written Opinion dated Mar. 10, 2020 for International Patent Application No. PCT/IB2019/000973.

* cited by examiner

CLOTHING HAVING ONE OR MORE PRINTED AREAS DISGUISING A SHAPE OR A SIZE OF A BIOLOGICAL FEATURE

TECHNICAL FIELD

The present disclosure generally relates to a custom clothing system. More specifically, the present disclosure relates to a custom clothing system which can generate customized clothing having one or more printed areas which disguise a shape or a size of a biological feature of the wearer.

BACKGROUND

Millions of people around the world regularly utilize their personal computing devices to shop for items online. Many of these items are generic for a large majority of the users who consume them. Clothing, however, is a commonly purchased item which must be ordered in a particular size (i.e., the size of the purchaser or a recipient of the clothing). While many online clothing retailers provide clothing of varying sizes, these sizes may not sufficiently fit the purchaser when the clothing arrives. For example, an article of clothing sold in a medium size by one vendor may be larger or smaller than a medium size article of clothing sold by another vendor. Moreover, because each person's body is uniquely shaped and sized, a generic size of clothing may not adequately fit each person's body which falls within a particular size category. There is a need for a system which enables a user to order articles of clothing which accurately fit their body type and also allows the user to customize the article of clothing to realize their needs.

SUMMARY

One aspect of the present disclosure relates to an article of clothing having a material and a non-repeating print. The material can be configured to clothe a predetermined portion of a body of a wearer. The material can include an outer surface. The non-repeating print can be positioned on at least a portion of the outer surface of the material. The non-repeating print can be configured to disguise a biological feature of the wearer.

The non-repeating print can be positioned on a portion of the material which covers the biological feature. The non-repeating print can be configured to disguise the biological feature of the wearer by minimizing a perceived size or shape of the biological feature. The predetermined portion of the body can be the torso of the wearer and the non-repeating print can be positioned on the outer surface of the material which covers the stomach of the wearer.

In some examples, the non-repeating print can be positioned on a portion of the material covering a second biological feature. The non-repeating print can be configured to disguise the initial biological feature by drawing attention toward the second biological feature. The article of clothing can also include a support member operably coupled to the material. The support member can be configured to apply a compressive force to a portion of the body of the wearer. In some examples, the non-repeating print can be machine-readable and the wearer can be identifiable by a computer system configured to read the non-repeating print. The computer system can correlate the non-repeating print with the wearer. The non-repeating print can be non-symmetrical and can include at least one of a plurality of lines or a plurality of geometric shapes.

Another aspect of the present disclosure relates to a customized clothing system. The customized clothing system can include a computing device having one or more processors and one or more non-transitory computer-readable media which store computing instructions and can be configured to run on the one or more processors and perform steps. The computing device can perform the step of receiving physiological information from a user at an interface of the computing device. The computing device can also perform the steps of capturing one or more images of the user and comparing the physiological information and the one or more images to a set of templates stored on the computing device. The computing device can also perform the steps of selecting a template which accurately resembles the user's body and generating an avatar based on the template. The computing device can also perform the steps of displaying the avatar, on a display of the computing device, in a virtual article of clothing, and selecting a biological feature of the avatar. The computing device can also perform the step of positioning a non-repeating print on the virtual article of clothing to disguise the biological feature.

In some examples, the computing device can also perform the step of coordinating manufacturing and shipping of an article of clothing to the user which is identical to the virtual article of clothing. The non-repeating print can be screen printed on an outer surface of the article of clothing. The non-repeating print can be adhered to an outer surface of the article of clothing. In some examples, capturing the one or more images of the user includes utilizing a camera which is communicatively coupled to the computing device. Each template of the set of templates stored on the computing device can include a three dimensional (3D) model of a human body with standard mean anthropometry measurements. The physiological information can include at least one of a height or weight of the user.

Yet another aspect of the present disclosure relates to a method for identifying and tracking a user based on a machine-readable non-repeating print. The method can be implemented via execution of computing instructions configured to run at one or more processors and configured to be stored at non-transitory computer-readable media. The method can include reading, with a camera, one or more machine-readable non-repeating prints positioned on an article of clothing of a user. The method can also include comparing the one or more machine-readable non-repeating prints with a database of machine-readable non-repeating prints. The method can also include identifying, using the comparison, the user wearing the article of clothing having the one or more machine-readable non-repeating prints. The method can further include tracking a location of the user using the camera and tracking a movement of the user using the camera. The method can also include recording information relating to the location and the kinetic or physiological movement of the user at a computing device.

In some examples, tracking the location of the user can include tracking a duration of time the user remains in the location. In some examples, the method can include communicating, to the user, the information relating to the location and movement of the user, wherein the information is communicated to a smart phone, a tablet computing device, or a laptop computing device.

In some examples, the method can also include reading, with the camera, one or more machine-readable non-repeating prints positioned on an article of clothing of a second user; comparing the one or more machine-readable non-repeating prints with the database; identifying, using the comparison, the second user wearing the article of clothing having the one or more machine-readable non-repeating prints; tracking a location of the second user using the camera; tracking a movement of the second user using the camera; and recording information relating to the location and movement of the second user at a computing device.

Yet another aspect of the present disclosure relates to a method for identifying and tracking a user based on a machine-readable non-repeating print. The method can be implemented via execution of computing instructions configured to run at one or more processors and configured to be stored at non-transitory computer-readable media. The method can include identifying a user of a customized clothing system and recalling stored information relative to the user's body. The method can also include receiving an input from the user relative to the user's body and modifying the stored information relative to the user's body based on the input. The method can also include generating a recommendation to the user to modify a virtual article of clothing based on the input. In some examples, the input can be received at an interface of a computing device.

The above summary of the present invention is not intended to describe each configuration or every implementation of the present invention. The Figures and the detailed description that follow more particularly exemplify one or more configurations.

BRIEF DESCRIPTION OF THE DRAWINGS

The accompanying drawings and figures illustrate a number of exemplary configurations and are part of the specification. Together with the present description, these drawings demonstrate and explain various principles of this disclosure. A further understanding of the nature and advantages of the present invention can be realized by reference to the following drawings. In the appended figures, similar components or features can have the same reference label.

Figure 1:
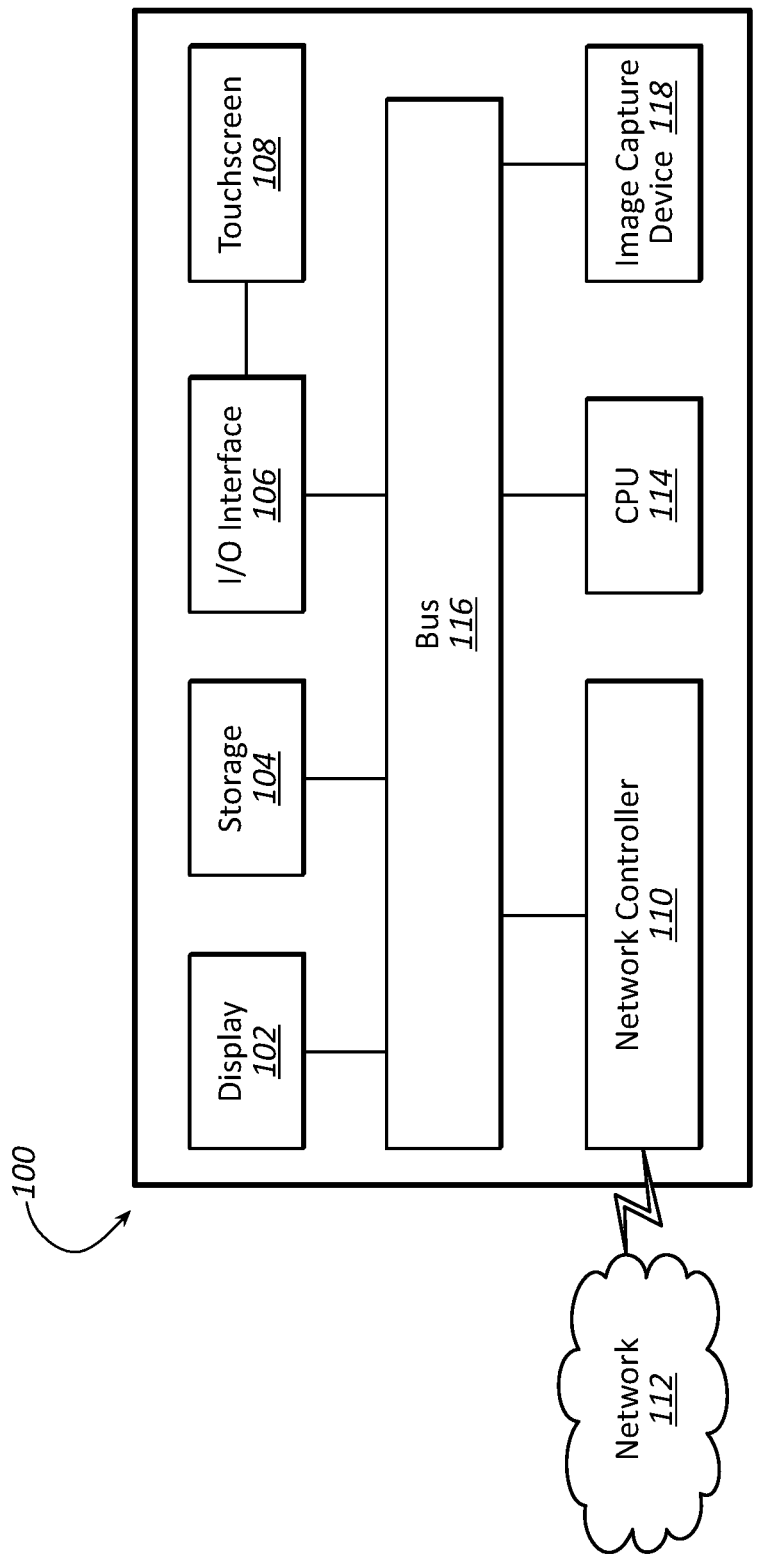
FIG. 1 is a schematic view of a computing device, according to the present disclosure.

While the configurations described herein are susceptible to various modifications and alternative forms, specific configurations have been shown by way of example in the drawings and will be described in detail herein. However, the exemplary configurations described herein are not intended to be limited to the particular forms disclosed. Rather, the instant disclosure covers all modifications, equivalents, and alternatives falling within the scope of the appended claims.

DETAILED DESCRIPTION

One aspect of the present disclosure generally relates to a customized clothing system. The customized clothing system can include a computing device configured to generate an avatar which substantially resembles a user's biological attributes (e.g., height weight, etc.) and measurements (e.g., dimensions of neck, chest, stomach, shoulders, arms, hips, waist, legs, etc.). To generate the user's avatar, the computing device can analyze one or more images of the user to accurately generate body data or anthropometry measurements relative to the user's biological attributes and dimensions. The computing device can then utilize the avatar to create custom fitting clothing having one or more printed areas configured to disguise at least one of a shape or a size of one or more biological features of an individual wearing the clothing. The one or more printed areas on the clothing can be specifically designed to draw attention away from or otherwise disguise, camouflage, or conceal a biological feature of the wearer on a portion of the body of the wearer that is covered by the clothing.

Additionally or alternatively, the one or more printed areas on the clothing can also be configured to direct attention toward particular areas of the body or one or more biological features. Advantageous to conventional clothing, the articles of clothing having the one or more printed areas according to this disclosure can look stylish and also allow a wearer to feel more comfortable about his/her body as the optical properties of the printed area make it more difficult for the human eye to distinguish biological features of the wearer.

The present description provides examples, and is not limiting of the scope, applicability, or configuration set forth in the claims. Thus, it will be understood that changes can be made in the function and arrangement of elements discussed without departing from the spirit and scope of the disclosure, and various configurations can omit, substitute, or add other procedures or components as appropriate. For instance, the methods described can be performed in an order different from that described, and various steps may be added, omitted, or combined. Also, features described with respect to certain configurations can be combined in other configurations.

In one example, the customized clothing system can include an application or other software which operates on a computing device, as depicted in FIG. 1. The computing device 100 can be a mobile computing device, for example, a mobile phone, a tablet computer, a laptop computer, or any other mobile computing device. The computing device 100 can include a display 102, storage 104, an I/O interface 106, a network controller 110, and a central processing unit (CPU) 114. Each element of the computing device 100 can be operably coupled to a bus 116 which permits communication and inter-operability between the elements of the computing device 100. The computing device 100 can utilize an operating system such as iOS®, ANDROID®, MS-DOS®, MS-WINDOWS®, OS/2®, UNIX®, LINUX®, or another known operating system. The operating system can issue commands and interact with the customized clothing system to cause the computing device 100 to carry out the respective steps, functions and/or procedures in accordance with the functionality described herein.

The display 102 can be configured to display content to a user of the computing device 100. For example, the display 102 can depict an avatar, user interface options relative to the displayed avatar (e.g., edit body data, highlight biological features, etc.), and/or any other information relative to the customized clothing system. In some examples, the display 102 can be configured to receive touch input (i.e., via a touchscreen 108) from a user of the computing device 100. The display 102 can be a liquid crystal display (LCD), light-emitting diodes (LED), organic light-emitting diodes (OLED), or any other display technology that can be utilized to accommodate the functionality of the customized clothing system described herein.

The storage 104 or memory can store computer-readable medium or computer-executable software which causes the computing device 100 to perform various tasks (via the CPU 114) and display information, transmit or receive data, or otherwise cause the computing device to perform the various functions described herein. For example, the storage 104 can store computer-readable medium which causes the computing device 100 to analyze images of a user to generate and display an avatar which accurately resembles the user's biological measurements and features. The storage 104 can also store body data or physiological information (e.g., height, weight, age, gender, waist dimension, etc.) of one or more users, a user's exercise history, or any other information relative to a user. The storage 104 can be volatile memory such as random access memory (RAM) and/or non-volatile memory such as read-only memory (ROM).

The I/O interface 106 can manage audio and visual output of the computing device 100. For example, the I/O interface 106 can be configured to function in concert with the CPU 114 to display one or more items of clothing on the display 102 (i.e., clothing being worn by the user's avatar). The I/O interface 106 can also manage user input to the computing device 100. For example, the I/O interface 106 can recognize an occurrence of user input at the display 102 (e.g., a capacitive touch input at a location of the touchscreen 108) and communicate that input with another component of the computing device 100 (e.g., the CPU 114). In some examples, the I/O interface 106 can cause the CPU 114 to implement a computer-readable software which responds to the particular input. For example, a user can choose one or more locations which the user desires non-repeating prints to be positioned on an article of clothing and the processor can dynamically alter the display to show the prints being moved or inserted at the desired locations in real time.

The network controller 110 can manage input and output signals relative to the computing device 100. The network controller 110 can also be configured to manage peripheral devices not integrated into the computing device 100 (e.g., a server, a modem, a keyboard, a mouse, another mobile computing device, etc.). The network controller 110 can communicate using physical wires or cables to other peripheral devices (e.g., the network 112). Additionally or alternatively, the network controller 110 can communicate with peripheral devices using wireless means of communication, such as Bluetooth or communications delivered over a wireless local area network (WLAN).

In some examples, the network controller 110 can be configured to operably communicate with a network 112 (e.g., a server). The network 112 or server can send, receive, store, and process data or computer-readable software. For example, the network controller 110 of the computing device 100 can send or transmit images of the user from the computing device 100 to the network 112 and thereafter receive processed data, derived using the images, from the network 112. In some examples, the network controller 110 of the computing device 100 can send data or other information to the network 112 to be stored on a memory or storage of the network 112.

The CPU 114 or processor can include an intelligent hardware device, (e.g., a general-purpose processor, a digital signal processor (DSP), a microcontroller, an application-specific integrated circuit (ASIC), a field-programmable gate array (FPGA), a programmable logic device, a discrete gate or transistor logic component, a discrete hardware component, or any combination thereof). In some examples, the CPU 114 can be configured to operate a memory array using a memory controller. In other cases, a memory controller may be integrated into the CPU 114. The CPU 114 can be configured to execute computer-readable instructions stored in the storage 104 or memory to perform various functions (e.g., functions or tasks supporting the generation of custom fitting clothing for the user). The CPU 114 can also be configured to execute computer-readable instructions stored at the network 112.

The computing device 100 can receive and store information (i.e., through the I/O interface 106 and the network controller 110. In some examples, the computing device 100 can also include an image capture device 118 (e.g., a camera). Additionally or alternatively, the computing device 100 can be operable to receive an image or picture taken with an image capture device which is separate from the computing system 100 (i.e., a digital camera). The image capture device 118 can be configured to take one or more pictures or videos of a user. The one or more pictures (or videos) can be processed or analyzed by the computing device 100 to determine the dimensions and measurements of a subject of the picture. For example, a mobile phone can be used to capture one or more pictures or images of an individual.

Figure 2A:
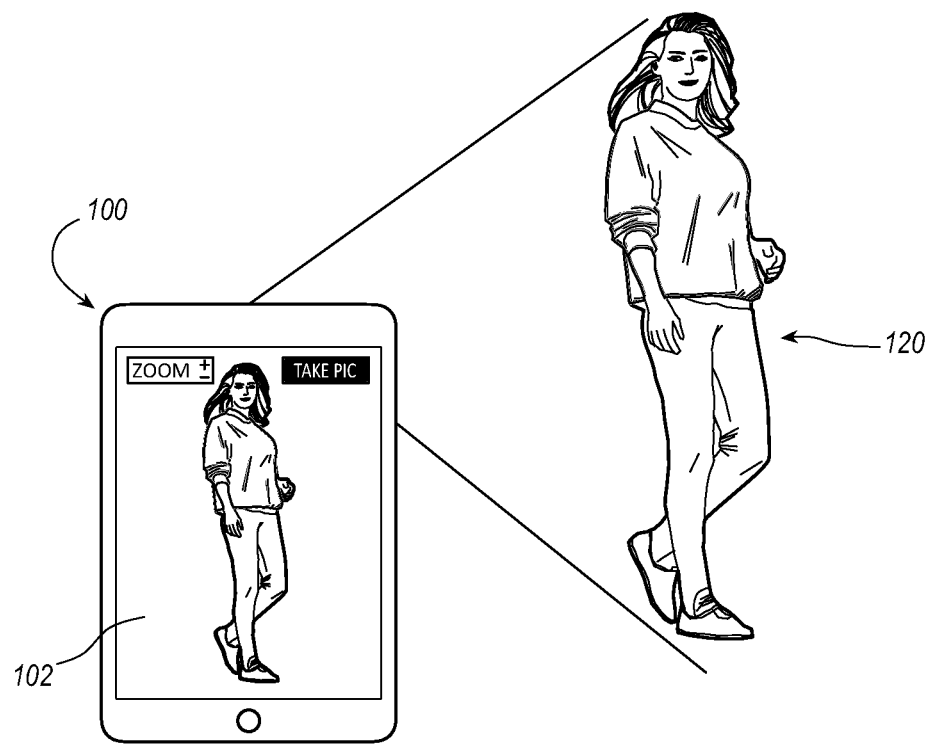
FIG. 2A is a perspective view of a person being photographed using a computing device, according to the present disclosure.

FIG. 2A depicts a person 120 being photographed using a computing device 100. In some examples, the computing device 100 can be a mobile phone, tablet computer, or other mobile electronic device which includes a camera or other image capture device. Although the person 120 is being photographed from a particular perspective relative to the computing device 100, a set of images or photographs can be used to capture images of the person 120 from various perspectives. For example, the person 120 can be photographed from the front, left side, right side, and rear perspective. The person 120 can also be photographed while positioned in front of a backdrop which is unbroken and uniform to ease analysis performed by the computing device 100 which generates the body data relative to the dimensions and measurements of the person 120. Similarly, one or more videos of the person 120 can be recorded on the computing device 100.

The display 102 of the computing device 100 can, in some examples, display commands which instruct the camera operator to capture images or videos of the person 120 from various perspectives. For example, the display 102 can display commands which instruct the camera operator to first capture an image of the person 120 from the front, then display commands which instruct the camera operator to capture an image of the person 120 from the rear. After capturing or taking the requested images of the person 120, the computing device 100 can process the images to generate body data relative to the person's anthropometry measurements (e.g., waist circumference, arm length, torso measurements, etc.).

The computing device 100 and/or the network 112 can receive one or more the images or videos and process the images or videos to generate an accurate representation (e.g., an avatar) of the subject of the images or videos. In one example, the computing device 100 can transmit the images or videos to the network 112 for processing. In one example, the computing device 100 can process the images or videos without utilizing the network 112. In another example, the computing device 100 and the network 112 can both be utilized to process the images or videos.

The computing device 100 (and/or the network 112) can store a plurality of templates, each template can include associated template data making up a three dimensional (3D) model of a human body with standard mean anthropometry measurements. The computing device 100 (and/or the network 112) can process the images or video by comparing physiological information supplied by the user (e.g., height, weight, sex, etc.) with a first representation based on the images or videos to select a template, stored in the storage 104 or network 112, which most closely resembles the user's body. After selecting a template, the computing device 100 can: 1) segment the foregrounds (human body) from the images and convert the first representation into respective silhouettes; 2) use the segmented foregrounds and their respective silhouettes to extract features and measurements of key points and/or descriptors and/or features; 3) use the extracted features and key point measurements to modify the 3D model of the selected template to create a modified subject-specific 3D model image (being a second representation); 4) associate the modified 3D model image to the user account; and 5) delete/destroy the images of the first representation. This process for analyzing images and generating models is described in more detail in U.S. Pat. No. 9,949,697 titled "Imaging a Body" by Iscoe et al., which is hereby incorporated by reference in its entirety for all purposes.

Figure 2B:
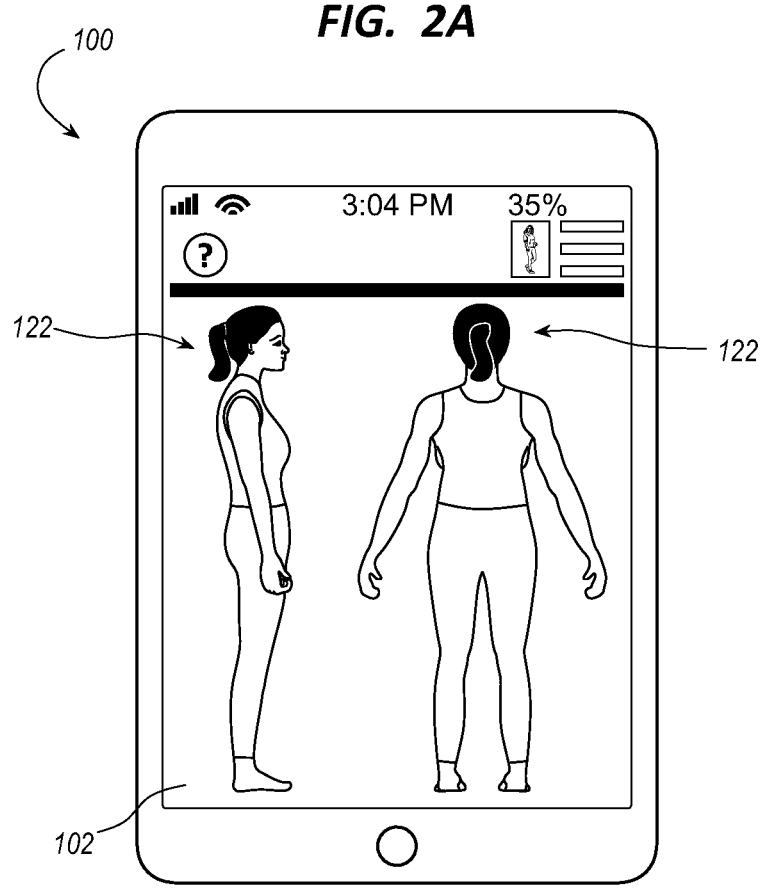
FIG. 2B is a front view of a display of a computing device showing multiple views of an avatar generated using a subject specific 3D model image, according to the present disclosure.

FIG. 2B depicts a display 102 of a computing device 100 showing multiple views of an avatar 122 generated using the process previously described. As depicted in FIG. 2B, various measurements and dimensions of the user's body have been estimated to generate the avatar 122 which accurately resembles an individual's body.

In some examples, the custom clothing system can be utilized to generate, view, modify, and order custom fitting clothes using, for example, a software application on a computing device 100 (e.g., a smart phone). The custom clothing system can be configured to display custom fitted clothing 124, 126 on the user's avatar 122 at the display screen 102 of the computing device 100 (see FIG. 3). For example, the computing device 100 can be configured to display the user's avatar 122 wearing custom fitted exercise apparel which has been modified to fit the user's body. Hence, a user can view the apparel 124, 126 on their avatar 122 before initiating the purchase, manufacture, and shipment of the apparel 124, 126. By generating custom apparel which is accurately sized to fit the user's body, the user can avoid ordering and purchasing inadequate and unsatisfactory clothing.

In some examples, the custom clothing system can also be configured to allow a user to modify the clothing (e.g., size, color, pattern, etc.). For example, a user can modify the clothing to include one or more non-repeating prints 128 to one or more areas or locations on the clothing 124, 126. Dazzle camouflage is an example of a non-repeating print 128 which is configured to optically distort the appearance of an object (e.g., a biological feature of a person's body). Dazzle camouflage is a plurality of geometric shapes that can have contrasting colors which interrupt and intersect each other. Traditional camouflage is configured to hide or blend a wearer within his/her environmental surroundings. Dazzle camouflage, however, can be used to draw attention to an object while disguising, distorting, or otherwise altering a third party's optical perception of one or more features of the object.

Figure 3A:
FIG. 3A is a front view of an example of a non-repeating print, according to the present disclosure.
Figure 3B:
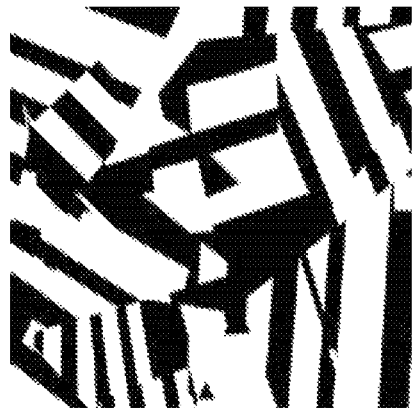
FIG. 3B is a front view of another example of a non-repeating print, according to the present disclosure.

FIGS. 3A and 3B show examples of dazzle camouflage, according to the present disclosure. The examples of non-repeating prints (e.g., dazzle camouflage) depicted in FIGS. 3A and 3B constitute regions of geometric shapes which overlap one another. The non-repeating prints (e.g., dazzle camouflage) can include a first region of geometric shapes having contrasting colors which obliquely intersect a second region of geometric shapes having contrasting colors. In some examples, the dazzle camouflage need not be formed using parallel contrasting lines (as depicted in FIG. 3A), but can also be formed using one or more non-symmetrical geometric shapes (as depicted in FIG. 3B). Although the examples depicted in FIGS. 3A and 3B depict black and white contrasting shapes, it should be appreciated that non-repeating prints can also include a plurality of colors and shades of colors. Furthermore, in some examples, the geometric shapes utilized within the non-repeating print can be arranged to form an object or an outline of an object (e.g., a piece of sporting equipment, an animal, a letter or word, etc.).

In many examples, the position of one or more the non-repeating prints 128 on the outer surface of the clothing 124, 126 is selected based at least partially on the biological features unique to the wearer that will be wearing the articles of clothing 124, 126.

Figure 4:
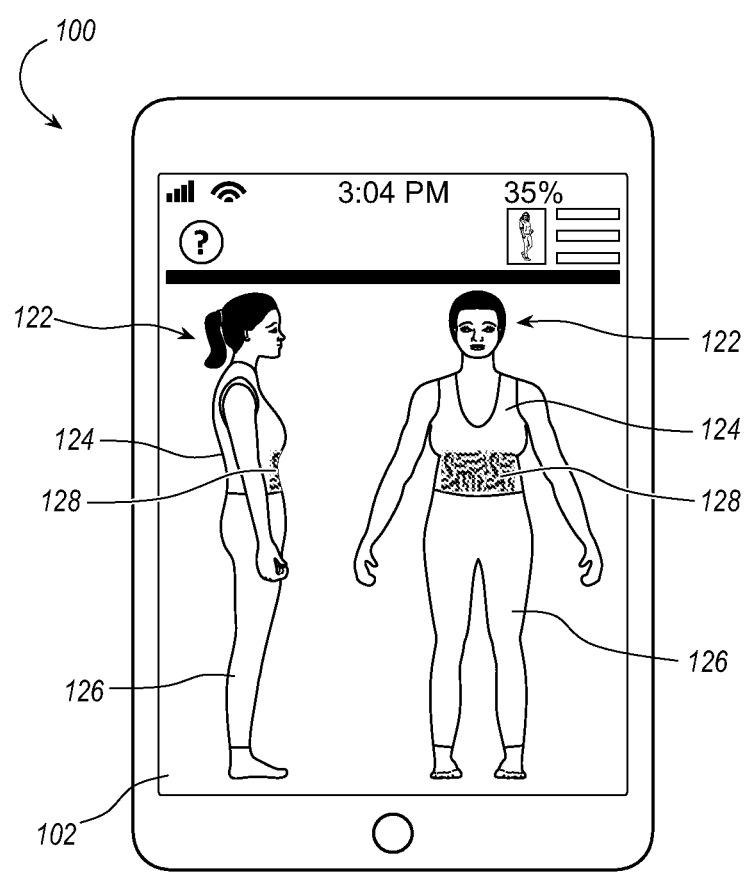
FIG. 4 is a front view of a display of a computing device showing multiple views of an avatar wearing custom fitting clothing, according to the present disclosure.

In some examples, the position of the non-repeating print 128 (on the outer surface of the clothing 124, 126) can be selected by the wearer or some other user of a customized clothing system on the computing device 100. For example, a wearer may desire to have his or her stomach disguised to appear smaller than the actual dimensions of his or her stomach. Accordingly, the wearer (or another user) can select, on the customized clothing system operating on his/her computing device 100, an exercise shirt 124 which includes a non-repeating print 128 in the area of the outer surface that covers his/her stomach (as depicted in FIG. 4). Alternatively, the wearer (or another user) can select a location for a non-repeating print on an exercise shirt that covers a portion of the body adjacent to the stomach in order to distract a third party from looking at the wearer's stomach.

In some examples, an area or location for the non-repeating print 128 on the outer surface of the apparel 124, 126 can be selected by the customized clothing system based on body data and/or the subject specific 3D model of the wearer stored by the customized clothing system. As described above, the body data can be physiological information entered by the wearer or anthropometry measurements collected from one or more images of the wearer received by the customized clothing system. For example, the customized clothing system can include a series of fields for a user to enter body data or physiological information, such as a height dimension, a weight dimension, a waist dimension, a leg length, an arm length, a bust dimension, a neck dimension, a percentage of body fat, and so on. Based on data received from the user and anthropometry measurements derived from the one or more images of the user, the custom clothing system can recommend one or more locations for placing one or more non-repeating prints.

FIG. 4, shows an example of a non-repeating print 128 on an outer surface of an article of clothing 124 on a user's avatar 122. As shown in FIG. 4, the non-repeating print 128 can include a printed design having optical properties which hinder or impede a third party from distinguishing the shape or the size of a biological feature of the wearer that is covered by the non-repeating print 128. The non-repeating print 128 can be non-symmetrical and include at least one of a plurality of lines or a plurality of geometric shapes.

In many examples, an article of clothing is made of a material and the non-repeating print is visible on at least a portion of the material. The material can include any type of material, for example, cotton fabric, flax fabric, wool fabric, ramie fabric, silk fabric, denim, leather, nylon, polyester, elastane, acetate, cupro, flannel, lyocell, polyvinyl chloride (PVC), rayon, or any combination thereof. The material can be configured to clothe a predetermined portion of a body of a wearer. For example, the article of clothing can include any type of t-shirts, polos, sweatshirts, jackets, vest, other tops, pants, tights, shorts, other bottoms, socks, swimsuit tops and/or bottoms, or any combination thereof. The material includes an outer surface which faces outward from the body of the wearer. One or more additional layers of clothing may be positioned between the article of clothing having the non-repeating print and the body of the wearer. For example, while the wearer may be wearing one or more base layers underneath the article of clothing having the non-repeating print, the article of clothing is nonetheless understood to cover a biological feature of the wearer.

As depicted in FIG. 4, the article of clothing 124 includes a non-repeating print 128 that is positioned in a particular location on the outer surface of the material (e.g., over the stomach of the avatar 122). The non-repeating print 128 on the outer surface of the material can be configured to disguise at least one of a shape or a size of a biological feature or landmark of the wearer that is covered by the non-repeating print 128. Disguising at least one of the shape or the size of the biological feature or landmark of the wearer can include making the biological feature appear smaller, larger, flatter, rounder, etc., than the actual dimensions of the biological feature. Disguising the biological feature can also include making the biological feature less perceptible to the human eye or, alternatively, making the biological feature more perceptible to the human eye.

In many examples, the non-repeating print 128 is a deceptive fashion technique that has been customized based on the biological features of the wearer. The deceptive fashion technique can be an optical illusion, such as a dazzle camouflage, that incorporates a design which camouflages one or more parts of the body of the wearer that the wearer desires to highlight or conceal. The non-repeating print 128 can be non-symmetrical and can include at least one of a plurality of lines or a plurality of geometric shapes. More specifically, to disguise at least one of the shape or the size of the biological feature of the wearer, the non-repeating print 128 can include complex patterns of geometric shapes in contrasting colors, interrupting and intersecting each other, that result in optical properties that hinder a human from distinguishing at least one of the shape or the size of the biological feature of the wearer that is covered by the non-repeating print 128.

In some examples, the non-repeating print can be weaved into the outer surface of the material of the article of clothing during manufacture of the article of clothing. In some examples, the non-repeating print can be screen-printed, ironed, sewn, or otherwise adhered to the outer surface of the material of the article of clothing.

Figure 5:
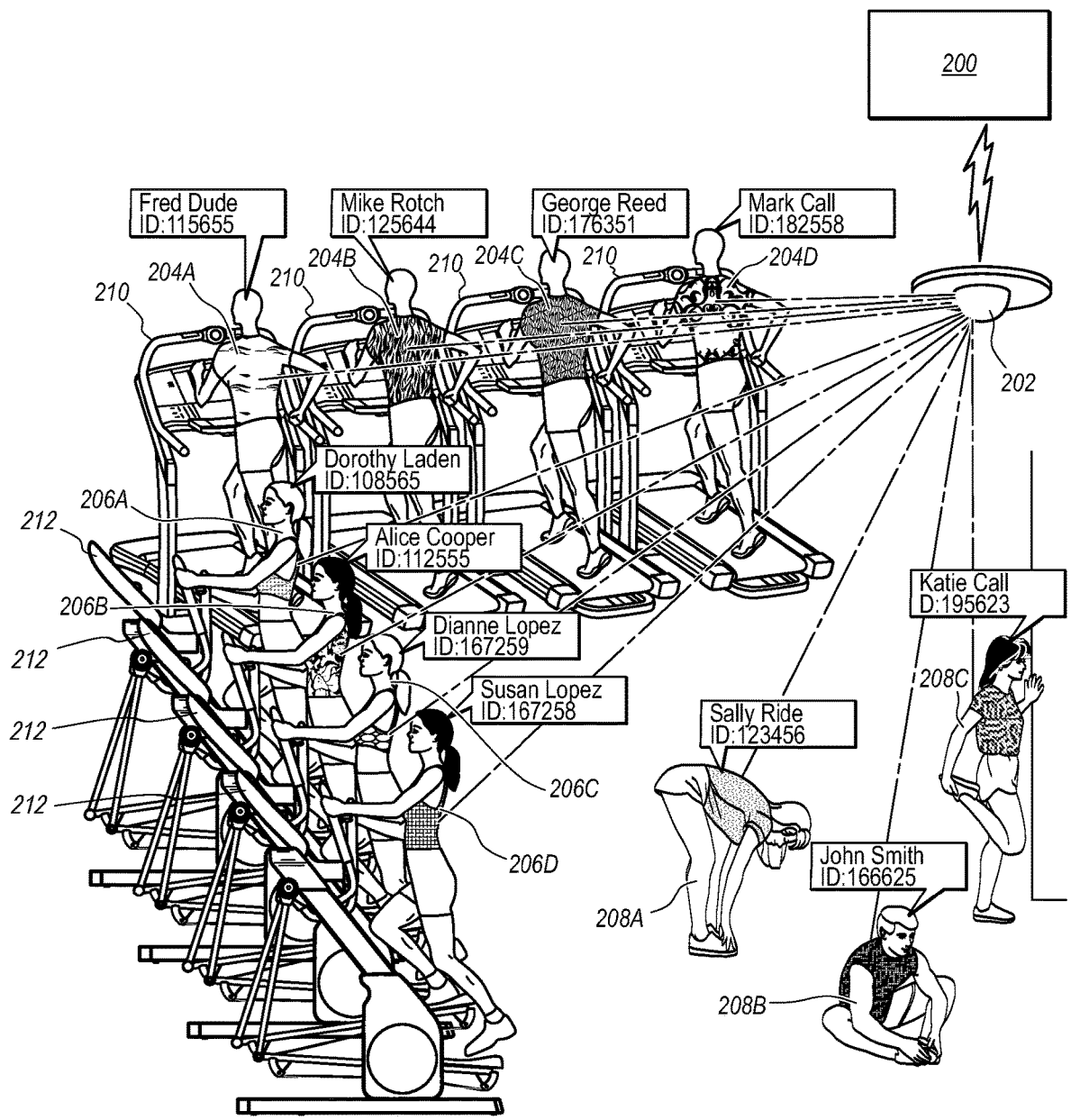
FIG. 5 is a perspective view of computing system and camera configured to read machine-readable non-repeating print and track movement, according to the present disclosure.

In many examples, at least a portion of the non-repeating print can be machine-readable and unique such that the wearer can be associated with the non-repeating print. For example, the wearer can be identifiable by a computer system which reads or recognizes the non-repeating print visible on the outer surface of an article of clothing. In some examples, third-party entities, such as gyms, can include cameras or other readers configured to recognize unique non-repeating print on articles of clothing being worn by one or more patrons of the gym. As shown in FIG. 5, a gym's computer system (e.g., a computing device 200 and an image capture device 202) can identify one or more patrons 204, 206, 208 of the gym by each patron's unique non-repeating print. In some examples, the third-party entity (e.g., a gym) can track and/or follow the wearer's progress and attendance at the third-party location(s). The progress and attendance can, in many examples, be shared with the computing device of the wearer, allowing the wearer to review his/her progress. The computing device of the wearer and/or the customized clothing system can offer suggestions of workout routines to reshape one or more biological features of the user's body and/or track progress of the wearer at the gym through the identification of the wearer using at least the portion of the non-repeating print on the article of clothing.

In some examples, the computing device 200 and camera 202 can track which areas of the gym the one or more patrons 204, 206, 208 are occupying and/or which exercises the one or more patrons 204, 206, 208 are undertaking. For example, the computing device 200 can recognize that each of the one or more patrons 204A-D are running on a treadmill 210, based on the location of the patrons 204A-D. Similarly, the computing device 200 can recognize that each of the one or more patrons 206A-D are running on an elliptical machine 212, based on the location of the patrons 206A-D. In some examples, the computing device 200 can detect that one or more patrons 208A-C are exercising without utilizing the gym's equipment, based on the location of the patrons 208A-C.

Figure 6:
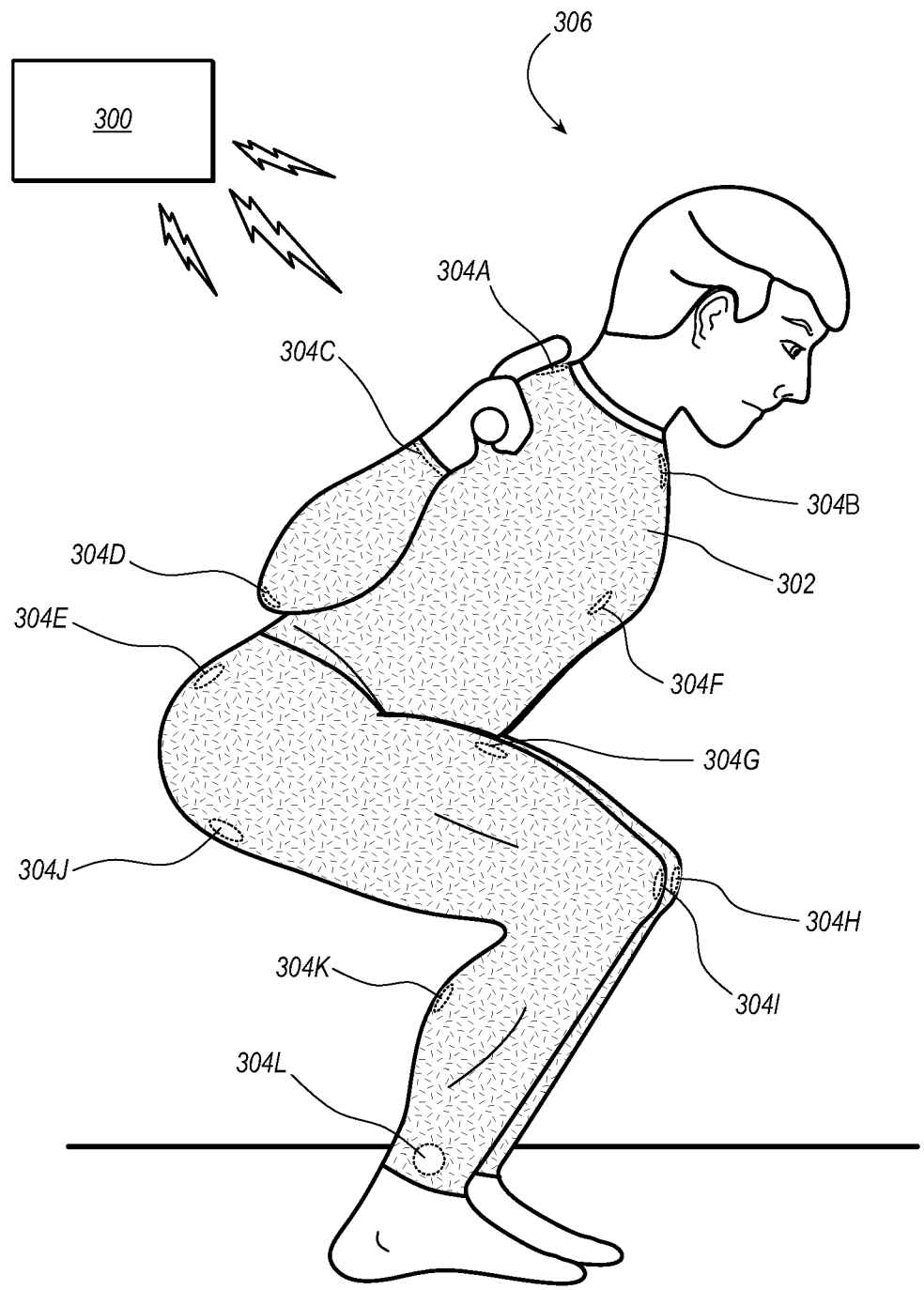
FIG. 6 is a side prospective view of a person wearing custom fitting clothing having sensors coupled thereto, according to the present disclosure.

As shown in FIG. 6, the article of clothing 302 can also include one or more sensors 304A-L woven into or otherwise secured to the article of clothing 302. The one or more sensors can be communicatively coupled to a computing device 300 (e.g., a computing device of the wearer 306 or a computer system of a third-party entity). The one or more sensors 304A-L can provide a "personal trainer" functionality to help guide the wearer 306 (e.g., to improve the wearer's weightlifting technique) while performing exercises, strength-training, or other activities inside or outside a gym.

In many examples, the one or more sensors 304A-L can be configured to give haptic feedback, such as vibration feedback, to the wearer 306 of the article of clothing 302 during movement or while the wearer 306 is exercising. The one or more sensors 304A-L can include an accelerometer and/or a gyroscope configured to detect motion and movement of the wearer 306. The haptic feedback can correspond to proper or improper movement of the wearer 306 during particular exercises. For example, as shown in FIG. 6, a wearer 306 can perform a squat weightlifting exercise and the sensors 304A-L can track or detect the relative movement of the wearer 306 and provide haptic feedback during the exercise that the wearer 306 is not performing the exercise properly. Detection of proper or improper performance of the exercise can be made by the one or more sensors 304A-L: (1) independent of the computer system 300 of the third-part entity or the computing device 300 of the wearer or (2) in conjunction with at least one of the computer system 300 of the third party entity or the computing device 300 of the wearer.

In some examples, the one or more sensors 304A-L can identify a particular exercise being performed by the wearer 306 based on the movement or relative position of the wearer 306 within an area (e.g., a particular area of a gym). The one or more sensors 304A-L can also detect if the wearer 306 is performing the identified exercise properly or improperly. Upon detection that the wearer is not performing the exercise properly, at least one sensor of the one or more sensors 304A-L can provide feedback to correct the improper performance of the exercise. In one example, two or more of the sensors 304A-L can retain a relative position to one another during a properly executed weightlifting exercise. For example, a first sensor 304B on the chest of a wearer 306 can remain horizontally aligned with a second sensor 304I on a knee of the wearer 306 while the wearer 306 performs a squat using a correct technique. If the first and second sensors 304B, 304I become misaligned while the wearer performs the squat, however, the first and/or second sensor 304B, 304I can provide haptic feedback (e.g., vibration feedback) to the wearer 306 to notify the wearer 306 of the improper technique.

In some examples, the wearer 306 can enter or input the particular exercise or a set of exercises to be performed into his/her computing device 300 (e.g., a smart phone) or a computing system 300 of a third-party entity. Alternatively or additionally, a camera of the computing device 300 or a camera of the computer system 300 can detect the particular exercise the wearer 306 is performing. The computing device 300 of the wearer or the computer system 300 of the third-party entity can communicate (e.g., wireless communication) which exercise is about to be performed by the wearer to the one or more sensors 304A-L on the article of clothing 302. The one or more sensors 304A-L can then detect motion or movement of the wearer 306 and determine whether the motion or movement of the wearer 306 is improper or proper based on the exercise being performed. In some examples, a camera of the computing device 300 of the wearer 306 or a camera of the computer system 300 of the third-party entity can detect motion or movement of the wearer and determine that the motion or movement of the wearer is improper based on the exercise being performed. Upon detection of proper or improper motion or movement, the computer system 300 of the third-party entity and/or the computing device 300 of the wearer 306 can communicate with the one or more sensors 304A-L which then provide a predetermined haptic feedback.

In some examples, if the motion or movement of the wearer 306 is improper, at least one of the one or more sensors 304A-L can provide haptic feedback to the wearer to indicate that the exercise is being performed improperly. The one or more sensors 304A-L, however, can additionally or alternatively provide haptic feedback to indicate that the wearer 306 has moved to a predetermined point in the exercise and should return to a starting position. For example, while the wearer 306 performs a squat, at least one sensor can provide haptic feedback to the wearer 306 to indicate that the wearer 306 has descended to a low point, and should now stand up again. In one example, this can be accomplished by configuring each sensor to detect its position relative to the other sensors. In some examples, at least one of the one or more sensors 304A-L can provide haptic feedback to the wearer 306 to indicate that the wearer 306 is at the end of a predetermined interval of the exercise. In some examples, the one or more sensors 304A-L includes a set of sensors. In these examples, less than all of the set of sensors can provide haptic feedback for a particular instruction to the wearer. For example, an article of clothing can include three sensors positioned, respectively, at a top back portion of the article of clothing, a middle back portion of the article of clothing, and a lower back portion of the article of clothing. During a squat weightlifting exercise, the wearer may lean too low with his/her shoulders. When this improper form is detected, the three sensor at the top back portion of the article of clothing can provide haptic feedback, indicating to the wearer that the wearer that his/her shoulder are too low relative to the other sensors for the squat weightlifting exercise. In some examples, the one or more sensors 304A-L can provide haptic feedback which motivate or encourage the wearer 306 with controlled vibrations before exercises. For example, one or more sensors 304A-L can provide haptic feedback with increasing frequency as the wearer 306 nears the conclusion of a particular exercise movement. The one or more sensors 304A-L can also provide haptic feedback to direct the wearer 306 to a next exercise during the workout. For example, a sensor positioned on the shoulder can provide haptic feedback to the wearer to indicate that the wearer should next exercise his/her shoulders.

In many examples, the one or more sensors 304A-L secured to the article of clothing 302 can, in conjunction with an application on the computing device 300 of the wearer 306 or the computer system 300 of the third-party entity, monitor progress of the wearer 306 during the exercises or movements. For example, the one or more sensors 304A-L can count or track the number of repetitions of an exercise performed by the wearer 306, and communicate this number of repetitions to at least one of the computer system 300 of the third-party entity or the computing device 300 of the wearer 306.

Figure 7:
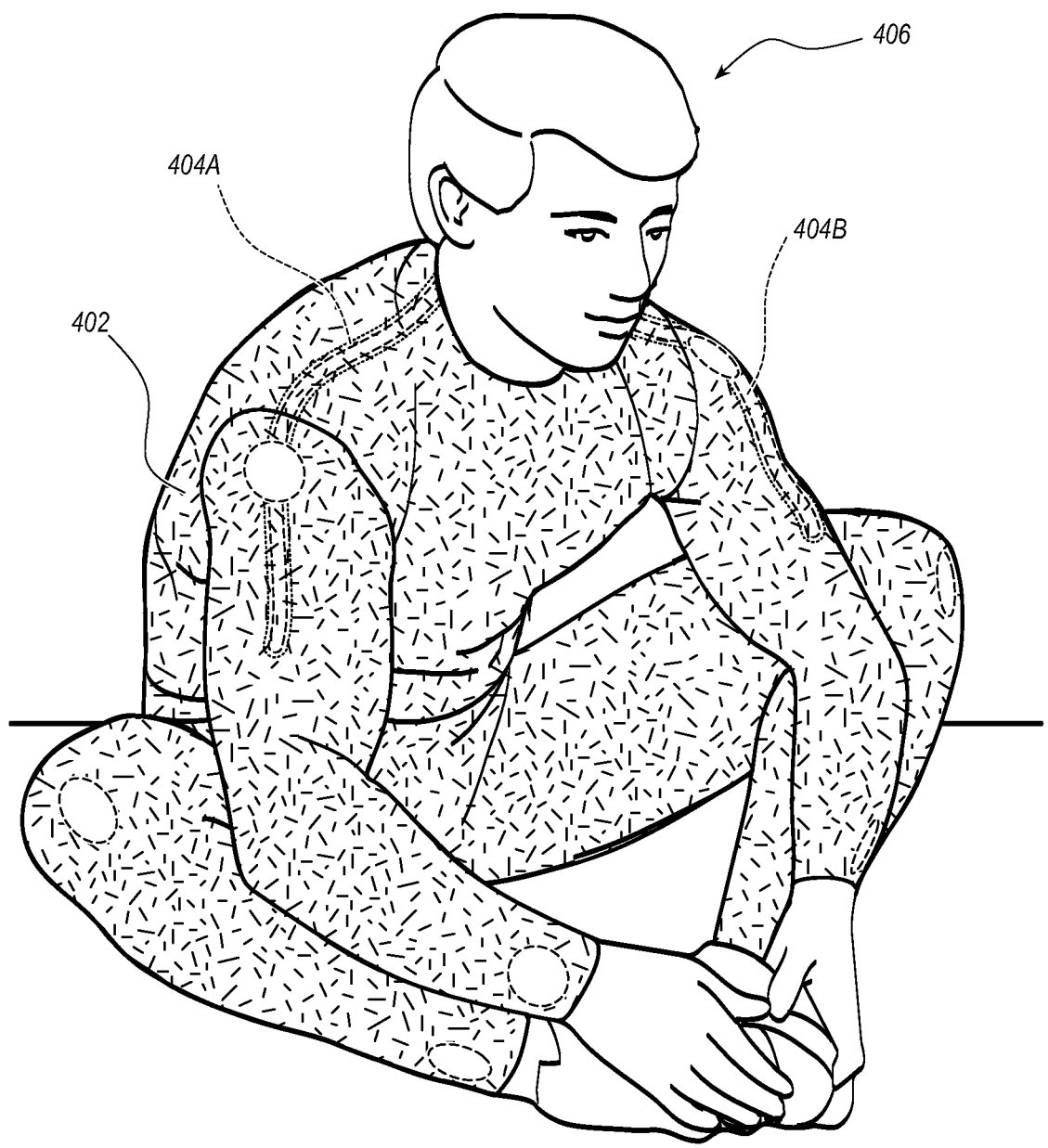
FIG. 7 is a front-side prospective view of a person wearing custom fitting clothing having a support member coupled thereto, according to the present disclosure.

FIG. 7 shows support members 404A, 404B disposed within an article of clothing 402. In many examples, the article of clothing 402 can include one or more customized portions having at least one support member 404A, 404B. In some examples, the support members 404A, 404B can each be an elongate member which is more resilient to bending or flexing than the fabric of the article of clothing 402 and thereby provide a biasing force which supports a wearer's injury. In other examples, the support member can be a compressive sleeve which provides compressive force to support the wearer's injury. The one or more support members 404A, 404B can be coupled to a plurality of locations on various articles of clothing including shirts, pants, socks, underwear, etc. For example, as shown in FIG. 7, a user or wearer 406 with injured shoulders can use the customized clothing system to create an article of clothing 402 which includes one or more support members 404A, 404B positioned within the article of clothing 402 and configured to support his/her injured shoulders while wearing the article of clothing 402. The support members 404A, 404B can be permanently coupled to the clothing (e.g., interwoven within the fabric of the article of clothing) or removably coupled to the clothing (e.g., positioned within a pocket or sleeve on the clothing).

The one or more support members 404A, 404B can be a fabric, polymer, metal, fiber/resin combination, or any other material which can be used to support the wearer's injury. In some examples, the one or more support members 404A, 404B can be coupled to an interior surface of the article of clothing. In some examples, the one or more support members 404A, 404B can be coupled to an exterior surface of the article of clothing. In some examples, the one or more support members 404A, 404B can form a portion of the article of clothing 402. For example, one or both of the arm sleeves of a shirt can be formed using a compressive sleeve configured to provide compressive support to the wearer's elbow(s).

In some examples, a single article of clothing can include multiple support members. The multiple support members can be configured to support similar or dissimilar injuries. For example, a pair of pants can be generated using the custom clothing system which incorporate support members (e.g., knee support sleeves) within each knee of the pants to provide pain relief and reduced swelling within the wearer's knees while exercising.

Figure 8A:
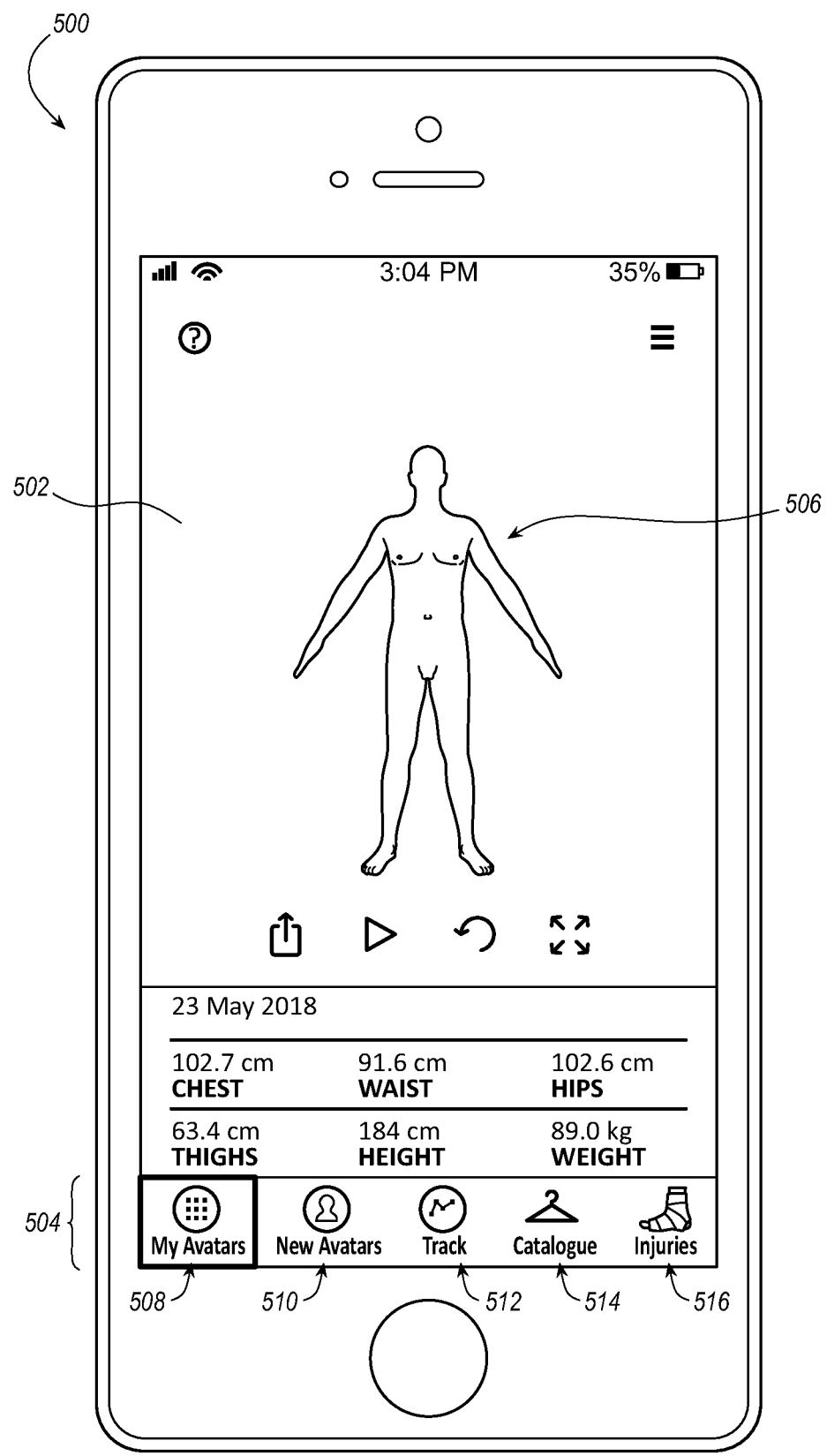
FIG. 8A is a front view of a display of a computing device showing an example of a user interface of a custom clothing system, according to the present disclosure.
Figure 8B:
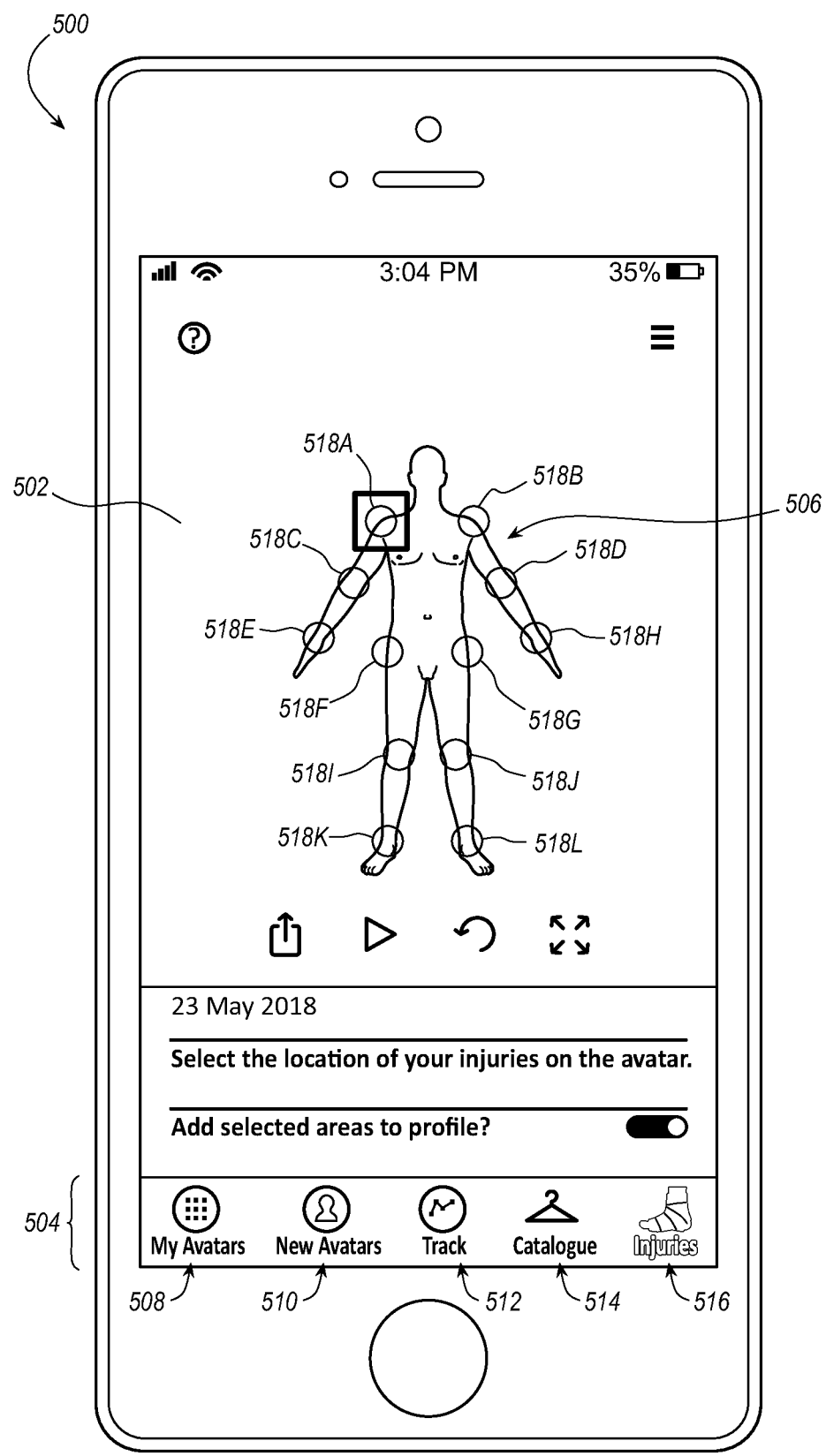
FIG. 8B is a front view of a display of a computing device showing another example of a user interface of a custom clothing system, according to the present disclosure.

FIGS. 8A and 8B show a computing device 500 having a display 502 which depicts a user interface 504 of a custom clothing system. The display 502 can also depict a user's avatar 506. Using the custom clothing system, the user can track exercise data (e.g., type of exercise, duration of exercise, etc.) and update physiological information (e.g., weight, height, age, gender, injuries, etc.) stored on the custom clothing system. Moreover, the user can generate, modify, and order custom fitting clothing based on the physiological information. In some examples, the clothing can include non-repeating prints which disguise or minimize biological features of the wearer's body. In some examples, the clothing can include support members. In some examples, the user can observe the clothing on an avatar which accurately portrays the dimensions and measurements of the user's body.

Within a user interface 504 of the customized clothing system, a user can generate an avatar (as previously described) or edit the current physiological information or body data which is utilized by the customized clothing system to generate the user's existing avatar 506. FIG. 8A depicts a user interface 504 of a custom clothing system operating on a user's mobile phone 500. The user interface 504 can include modules 508, 510, 512, 514, 516 which allow a user to navigate and operate various features of the custom clothing system. For example, a user can modify his/her physiological information to modify his/her current avatar 506 in a my avatars module 508. As depicted in FIG. 8A, the new avatar module 510 can be configured to allow a user to input their physiological information. As previously described, physiological information and anthropometry measurements from one or more images can be utilized by the computing device 500 to generate a new avatar. The avatar 506 can accurately resemble the user and allow the user to view their own body as a third party observer. Moreover, the user can rotate or otherwise vary the perspective of the avatar 506 to observe the fit and aesthetic appearance of the custom fitting clothing generated by the customized clothing system. In some examples, the customized clothing system can include a module (e.g., the track module 512) configured to track exercise characteristics of the user. For example, the user can be wearing an article of clothing which incorporates a non-repeating print thereon. Furthermore, the non-repeating print can be machine-readable and thereby allow a third-party (e.g., a gym) to track the user's movements and collect exercise data relative to the user's movements (as previously described in relation to FIG. 5).

As previously described, the user can utilize a computing device 500 (e.g., a smart phone) having the customized clothing system to generate, modify, shop, and order custom fitting clothing. The catalogue module 514 can be configured to allow a user to shop (e.g., view and order) for articles of clothing (e.g., pants, shorts, skirts, dresses, shirts, jackets, coats, etc.). While a user is shopping for articles of clothing, the user's avatar 506 can be displayed as wearing the article of clothing for which the user is shopping. For example, the avatar 506 can be displayed wearing a particular pair of pants after the user has placed the particular pair of pants in his/her virtual shopping cart. Additionally or alternatively, the user can select an input on the display 502 which is configured to toggle between views in which the display 502 depicts: 1) the user's avatar 506 wearing the articles of clothing for which the user is shopping; and 2) simply depicts the article of clothing for which the user is shopping without the avatar 506.

In some examples, the customized clothing system can include an injury module 516. The injury module 516 can allow the user to select one or more areas of the user's body which has sustained an injury. The injuries module 516 can also be configured to receive input from a user which removes a previously entered injury. For example, as depicted in FIG. 8B, the injuries module 516 can display the user's avatar 506 and allow a user to select and deselect one or more locations 518A-L on the body of the avatar 506 which have sustained or recovered from injuries. Data or user input received within each of the modules 508, 510, 512, 514, 516 can be utilized by another module of the customized clothing system. For example, an injury input at the injury module 516 can be utilized by the catalogue module 514 to position a support member within an article of clothing which supports the user's injury. For example, a user can input a recent shoulder injury into the injuries module 516 at location 518A and thereafter shop within the catalogue module 514 for exercise shirts. At or before the user orders a particular shirt, the customized clothing system can generate a message which prompts the user to add a support member to the shirt which will promote a faster recovery from the shoulder injury at the shoulder location 518A. In other examples, the customized clothing system may not recommend including a support member but the user may manually select the inclusion of a support member within his/her desired article of clothing at the shoulder location 518A.

Also contemplated in this disclosure are systems and methods for production and/or use of an article of clothing having one or more printed areas configured to disguise a shape or a size of a biological feature of a wearer. The systems and methods can include one or more computing devices having at least one processor, memory, a storage device, an I/O interface, and a communication interface. In some examples, the processor(s) of the one or more computing devices include(s) hardware for executing instructions, such as those making up a computer program. The computing devices can also include programmable software with instructions for coordinating activities described in the systems and methods presented herein.

Figure 9:
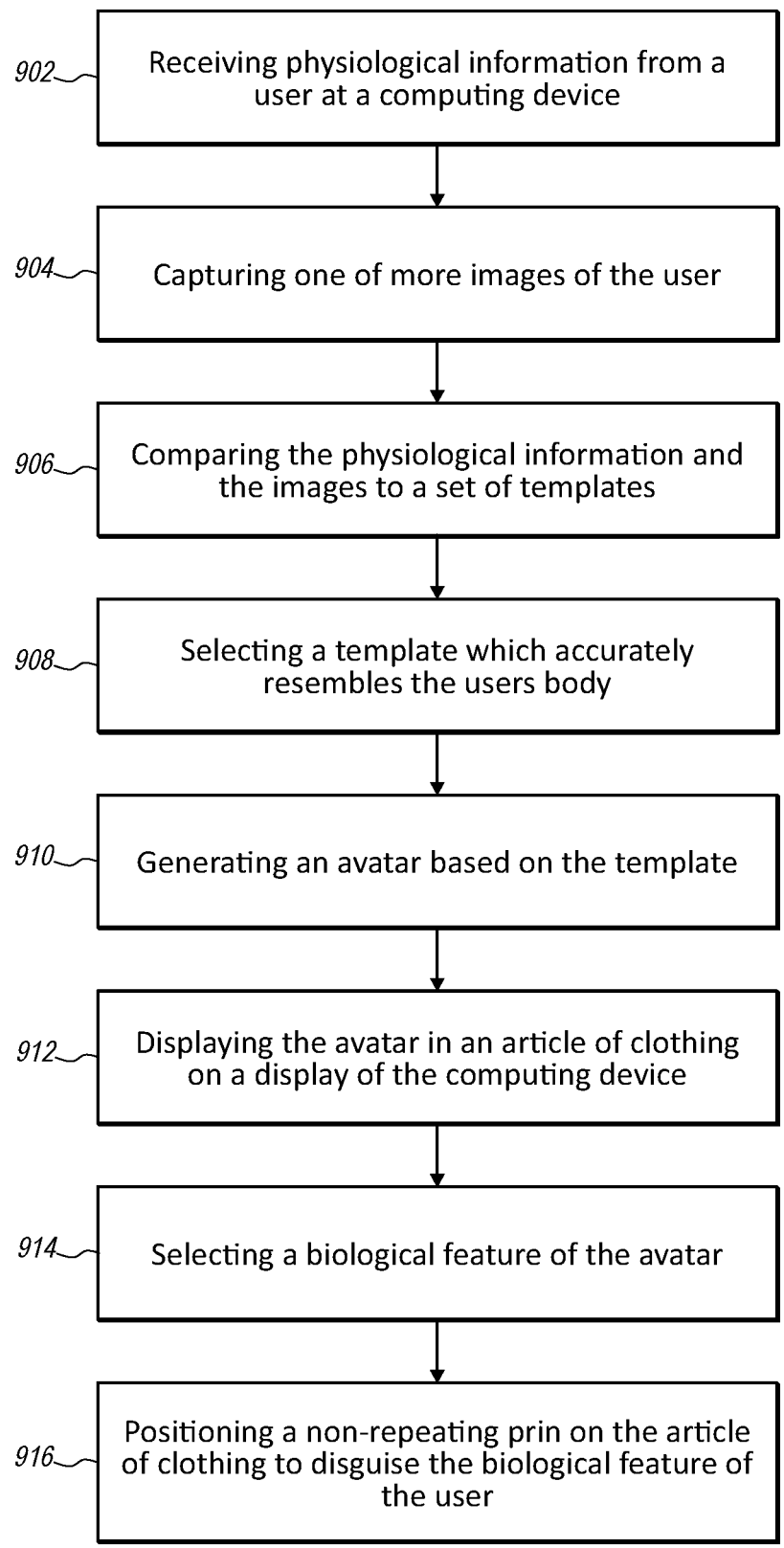
FIG. 9 is a block diagram of a method for generating an avatar for a custom clothing system, according to an example of the present disclosure.

FIG. 9 shows a flowchart illustrating a method 900 for generating an avatar which accurately depicts biological features of the user in accordance with aspects of the present disclosure. Each block depicted in FIG. 9 can represent an instruction which is executable by a computing device. In an example, the method can include receiving 902 physiological information from a user at a computing device, capturing 904 one or more images of the user, comparing 906 the physiological information and the images to a set of templates, selecting 908 a template which accurately resembles the user's body, generating 910 an avatar based on the template, displaying 912 the avatar in an article of clothing on a display of the computing device, selecting 914 a biological feature of the avatar, and positioning 916 a non-repeating print on the article of clothing to disguise the biological feature of the user.

At block 902, physiological information relative to the user's body is received at a computing device. In some examples, the user can input his/her physiological information at a user interface of the customized clothing system. This information can be received at a touchscreen of a computing device (e.g., a smart phone) and can be stored in the memory of the computing device. As previously described, the user can modify or edit physiological information stored within the computing device. The physiological information can include height, weight, gender, race, age, body mass index, or any other physical characteristic of the user's body. The physiological information can also include measurements or dimensions relative to the user's body. For example, a diameter of the user's waist, hips, chest or length of the user's arms, legs, and feet.

At block 904, images of the user are captured using an image capture device (e.g., a camera). The image capture device can be incorporated into a computing device of the user. For example, one or more images of the user can be captured using a camera coupled to a smart phone. The images can be photographs, videos, or any other medium which adequately captures the biological features of the user's body for the purposes described in the present disclosure. The one or more images captured of the user can be taken from varying perspectives of the user. For example, in one example, a first image of the user facing the camera can be captured and a second image of the user from a side perspective can be captured.

At block 906, the physiological information and the one or more images are compared to a set of templates. Each template of the set of templates contain one or more anthropometry measurements which include dimensions and proportions of the human body. At block 908, the template which most accurately resembles the anthropometry of the user's body is selected. At block 910, an avatar is generated based on the template selected at block 908. As previously described, selecting the template and generating the avatar involves analyzing silhouettes and foregrounds of each image to extract features and measurements of the key points, descriptors, and/or features of the images. This process is discussed in detail in U.S. Pat. No. 9,949,697 to Iscoe et al. which has been incorporated by reference in its entirety for all purposes.

At block 912, the avatar is displayed in one or more articles of clothing on a display of the computing device. As previously described, the article(s) of clothing can include any type of t-shirts, polos, sweatshirts, jackets, vest, other tops, pants, tights, shorts, other bottoms, socks, swimsuit tops and/or bottoms, or any combination thereof.

At block 914, the user or the computing device can select a biological feature on the avatar. The biological feature can constitute any feature on the user's body. For example, the biological feature can include the user's thighs, stomach, arms, buttocks, calves, chest, or any other part of the user's body. In many examples, selecting the biological feature can be made by at least one of a wearer or a user of the customized clothing system. For example, a wearer or other user can select a biological feature that the wearer or the user wishes to disguise. The selection can be made on a touchscreen of a computing device, a webpage, a smart phone application, or any other user interface operating on a computing device. In some examples, the computing device can automatically select (or recommend selecting) the biological feature based on physiological information of the wearer stored by the customized clothing system.

At block 916, the user or the computing device can position a non-repeating print on the article of clothing to disguise the biological feature selected in block 914. The non-repeating print can include any design which is configured to distort, disguise, minimize, or emphasize the selected biological feature. For example, a user can select the arms of his/her avatar to assist in detracting an observer's attention from the user's stomach.

To execute instructions, the processor(s) may retrieve (or fetch) the instructions from an internal register, an internal cache, the memory, or a storage device and decode and execute them.

Wearers may desire to select color schemes for the non-repeating print. Accordingly, in some examples, systems and methods can include receiving, with the computing device of the customized clothing system, a color scheme selection for the non-repeating print from at least one of the wearer or the user. In other examples, the color scheme of the non-repeating print is selected by the customized clothing system and can assist in disguising the biological feature of the wearer.

As described above, the non-repeating print can be configured to disguise at least one of a shape or a size of a biological feature of a wearer. The material can be configured to clothe a predetermined portion of a body of the wearer, the outer surface can include a total surface area and faces outward from the predetermined portion of the body of the wearer when the wearer wears the material as an article of clothing. The predetermined portion of the outer surface can be less than the total surface area of the outer surface.

In some examples, systems and methods can also include associating, with at least the computing device of the customized clothing system, the wearer with at least a portion of the non-repeating print, at least the portion of the non-repeating print being machine-readable and unique. By associating the wearer with at least the portion of the non-repeating print, the wearer can be identified using a camera, sensor, or other electronic device configured to read at least the portion of the non-repeating print. Accordingly, some systems and methods can also include reading, with a camera associated with the customized clothing system, at least the portion of the non-repeating print and identifying the wearer based on at least the portion of the non-repeating print.

Figure 10:
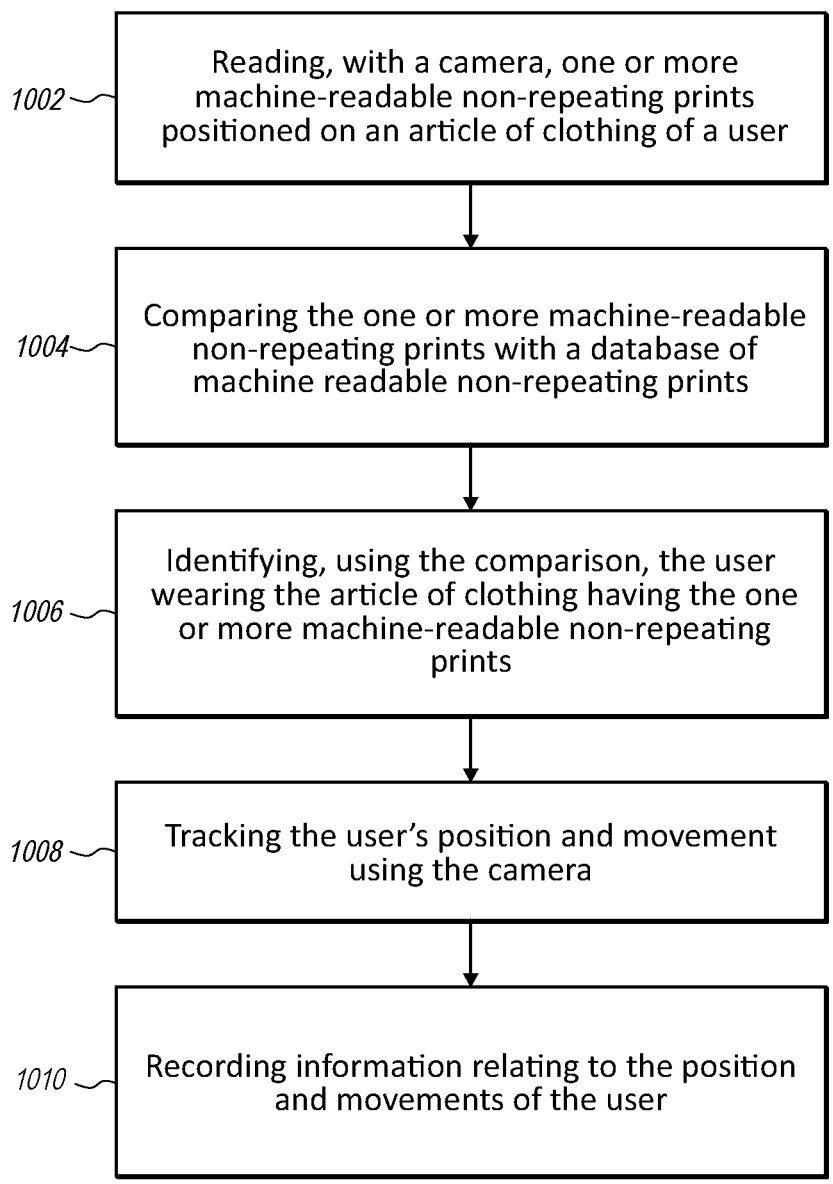
FIG. 10 is a block diagram of a method for identifying and tracking a user based on a machine-readable non-repeating print, according to an example of the present disclosure.

FIG. 10 shows a flowchart illustrating a method 1000 for identifying and tracking a user based on a machine-readable non-repeating print on the user's clothing in accordance with aspects of the present disclosure. Each block depicted in FIG. 10 can represent an instruction which is executable by a computing device. In an example, the method can include reading 1002, with a camera, one or more machine-readable non-repeating prints positioned on an article of clothing of a user; comparing 904 the one or more machine-readable non-repeating prints with a database of machine-readable non-repeating prints; identifying 1006, using the comparison, the user wearing the article of clothing having the one or more machine-readable non-repeating prints; tracking 1008 the user's position and movement using the camera; and recording 1010 information relating to the position and movements of the user.

At block 1002, a camera operably coupled to a computing system is configured to read or otherwise detect one or more machine-readable non-repeating prints on an article of clothing of a user. As previously described, the camera and computing system can be positioned within an area housing multiple users. For example, the camera can be placed within a gym and the multiple users can be patrons of the gym.

At block 1004, the one or more machine-readable non-repeating prints which have been read by the camera can be compared to a database of machine-readable non-repeating prints. The database can be stored on a mobile computing device, a server, or other storage device. The database can include a list of machine-readable non-repeating prints which are each associated with a particular user of the customized clothing system. At block 1006, the comparison of block 1004 is used to identify the user wearing the article of clothing having the one or more machine-readable non-repeating prints. The identity of the user can be determined by correlating the one or more machine-readable non-repeating prints on the clothing with the machine-readable non-repeating prints stored in the database.

At block 1008, the user's position and movements are tracked using the camera. In some examples, the camera can track the various locations which the user occupies. At block 1010, information or data relative to the user's movements and position are recorded. For example, a camera (and/or computing system) of a gym can track a patron as positioned on a treadmill for a first duration of time and record the duration of time the patron was on the treadmill on a computing system. The recorded information or data can thereafter be made available to the user (e.g., the gym patron). For example, the information or data can be sent to the user's mobile phone to allow the user to track his/her exercise routine.

In some examples, the customized clothing system can receive a request from a third-party entity, such as a gym, to access identifying information associated with the wearer, such as at least the portion of the non-repeating print. This allows a camera, scanner, or other electronic device at the third-party entity to identify the wearer at the third-party and transmit activities of the wearer at the third-party to the customized clothing system. For example, as noted above, the third-party can include a gym. Once the gym has identifying information associated with the wearer, the gym can identify the wearer by at least the portion of the non-repeating print using one or more cameras, scanners, or other electronic devices in the gym. The gym can then monitor and/or track progress of the wearer performing exercises and other activities at the gym. The wearer can access this information either through a mobile application or webpage associated with the gym or through a mobile application or webpage associated with the customized clothing system. The customized clothing system or a system associated with the gym can also transmit, to the device of the wearer, suggestions and workout routines to reshape a biological features covered by the non-repeating print.

In some examples, after identifying the wearer at the gym, a computing system associated with the gym and/or the customized clothing system can use the cameras at the gym to monitor the exercises or activities performed by the wearer to offer real-time guidance and/or follow-up guidance. For example, the computing system may detect that the wearer is performing a weight lifting exercise with incorrect form, and may transmit a message to the device of the user indicating the improper form and instructions on correction of the improper form. In some examples, the article of clothing can include one or more haptic devices secured to or interwoven with the article of clothing. The one or more haptic devices can be configured to provide real-time haptic feedback as described above, such as vibration, when the wearer performs an exercise correctly or incorrectly, depending upon system settings.

In some examples, systems and methods can also include coordinating, with the computing device of the customized clothing system, shipping of the article of clothing to the wearer, the article of clothing including the material having one or more non-repeating prints.

As noted above, articles of clothing can also include one or more support members interwoven into or otherwise coupled to the article of clothing. The one or more support members can be positioned to support or remedy a chronic or acute injury or other physical ailment of the wearer.

Figure 11:
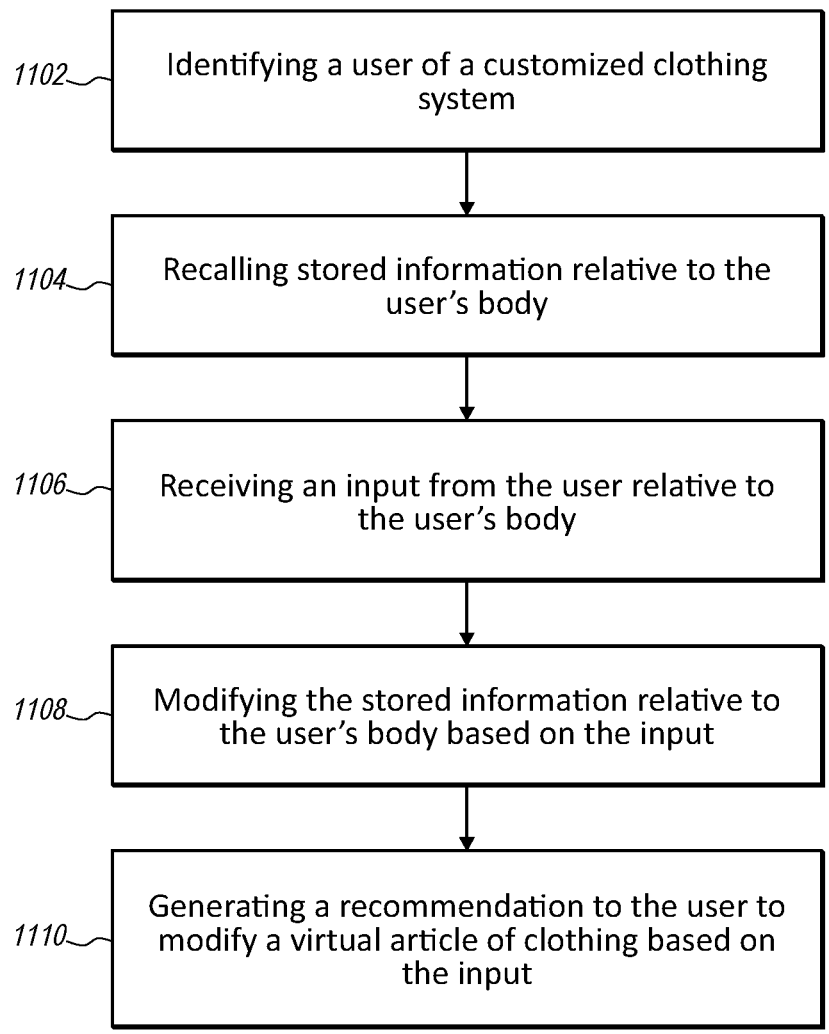
FIG. 11 is a block diagram of a method for modifying a virtual article of clothing based on a user input, according to an example of the present disclosure.

FIG. 11 shows a flowchart illustrating a method 1100 for modifying a virtual article of clothing based on user input in accordance with aspects of the present disclosure. Each block depicted in FIG. 11 can represent an instruction which is executable by a computing device. In an example, the method can include identifying 1102 a user of a customized clothing system; recalling 1104 stored information relative to the user's body; receiving 1106 an input from a user relative to the user's body; modifying 1108 the stored information relative to the user's body based on the input; and generating 1110 a recommendation to the user to modify a virtual article of clothing based on the modified information.

At block 1102, a user of the custom clothing system is identified. The user can be identified by logging into the customized clothing system (via a username and password combination, face recognition, etc.). For example, the user can enter login credentials on his/her smart phone, tablet, or other computing device.

At block 1104, the customized clothing system can recall stored information relative to the user's body. The information can be measurements, dimensions, injuries, or other physiological attributes of the user. For example, the customized clothing system can recall a stored avatar which accurately resembles the body of the user. The information can be stored on a computing device (e.g., smart phone) or otherwise communicated to the computing device from another computing device (e.g., a server).

At block 1106, an input from the user is received by the customized clothing system. In some examples, the input can be related to a recent physiological change the user has experienced (e.g., an injury). In some examples, the input can be related to an attribute change to the user's body (e.g., height, weight, etc.). The input can be received by the customized clothing system. For example, the customized clothing system can receive the input from the user via an input at a touchscreen on the user's smart phone.

At block 1108, the customized clothing system can modify, based on the input, the information relative to the user's body. For example, a physical attribute of the user's body can be modified to reflect a change in height, weight, etc. Additionally or alternatively, the information can be modified to reflect a recent injury or recovery from an injury.

At block 1110, the customized clothing system can generate a recommendation related to modifying a virtual article of clothing based on the modified user information. The recommendation can occur when a user is shopping for one or more articles of clothing using the customized clothing system. The recommendation can include an audio or visual prompt to a user, such as, a text box which displays on the user's smart phone or tablet. The recommendation can be directed toward an alteration to a virtual article of clothing (e.g., an article of clothing which is displayed on the user's avatar) such as, a reduction in the size of the article of clothing. The recommendation can also relate to incorporating a support member into an article of clothing based on a recent injury suffered by the user (e.g., incorporating a compressive knee sleeve into a pair of exercise shorts).

Accordingly, in some examples, systems and methods can also include coordinating, with the customized clothing system, custom support in the article of clothing for the wearer. For example, the wearer or other user can, on his/her computing device, enter information about one or more injuries, physical conditions, or physical ailments of the wearer. Upon receipt of the information about the one or more injuries, physical conditions, or physical ailments of the wearer, the customized clothing system can determine one or more portions of an article of clothing that can include additional interwoven support based on the one or more injuries, physical conditions, or physical ailments of the wearer. Upon determination of the one or more portions of the article of clothing that can include additional interwoven support, the customized clothing system can coordinate displaying, on a computing device of the wearer or other user, a recommendation that the article of clothing include one or more portions of additional interwoven support (i.e., a support member). The wearer or other user can then select none or at least one of the one or more portions of the article of clothing to include the additional interwoven support.

In some examples, a wearer or other user can, on his/her computing device, manually select one or more portions of his/her body that requires additional support be coupled to the article of clothing. For example, a wearer may have an injured shoulder that would benefit from additional interwoven support in a shirt. Accordingly, the wearer or other user may, on an electronic device, select that a shirt include additional interwoven support on the portion of the shirt that will cover the injured shoulder of the wearer.

Upon receiving a manual selection or a selection of at least one of the one or more portions of additional interwoven support recommended by the customized clothing system, systems and methods can include coordinating, with a computing device of the customized clothing system, incorporation of additional support in one or more portions of the article of clothing selected by the wearer or other user. Returning to the example above, upon receipt of a selection by the wearer that a shirt include additional interwoven support on the portion of the shirt that will cover the injured shoulder of the wearer, the customized clothing system can coordinate incorporation of additional support in a portion of the shirt that will cover the injured shoulder of the wearer.

Various inventions have been described herein with reference to certain specific configurations and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

I claim:

1. A customized clothing system, comprising:
a computing device having one or more processors and one or more non-transitory computer-readable media storing computing instructions configured to run on the one or more processors and perform the steps of:
receiving physiological information from a user at an interface of the computing device;
capturing one or more images of the user;
comparing the physiological information and the one or more images to a set of templates stored on the computing device;
selecting a template which accurately resembles the user's body;
generating an avatar based on the template;
displaying the avatar, on a display of the computing device, in a virtual article of clothing;
selecting a recommended location on the virtual article of clothing based on the physiological information; and
positioning a non-repeating print including dazzle camouflage on the virtual article of clothing at the recommended location.

2. The customized clothing system of claim 1, wherein the one or more processors are further configured to perform an act of coordinating manufacturing and shipping of an article of clothing to the user corresponding to the virtual article of clothing.

3. The customized clothing system of claim 2, wherein the non-repeating print is screen printed on an outer surface of the article of clothing.

4. The customized clothing system of claim 2, wherein the non-repeating print is adhered to an outer surface of the article of clothing.

5. The customized clothing system of claim 1, wherein capturing one or more images of the user includes utilizing a camera communicatively coupled to the computing device.

6. The customized clothing system of claim 1, wherein each template of the set of templates stored on the computing device include a three dimensional (3D) model of a human body with standard mean anthropometry measurements.

7. The customized clothing system of claim 1, wherein the physiological information comprises one of a height or a weight of the user.

8. A method for identifying and tracking a user based on a machine-readable non-repeating print, the method being implemented via execution of computing instructions configured to run at one or more processors and configured to be stored at non-transitory computer-readable media, the method comprising:
reading, with a camera, one or more machine-readable non-repeating prints positioned on an article of clothing of a user;
comparing the one or more machine-readable non-repeating prints with a database of machine-readable non-repeating prints;
identifying, using the comparison, the user wearing the article of clothing having the one or more machine-readable non-repeating prints;
tracking a location of the user using the camera;
tracking a movement of the user using the camera;

correlating the location and movement of the user to a set of activities undertaken by the user;

recording information relating to the set of activities at a computing device;

generating a progress report of the user based on the information relating to the set of activities; and communicating, to the user, the progress, wherein the progress report is communicated to a smart phone, a tablet computing device, or a laptop computing device.

9. The method of claim 8, wherein tracking a location of the user includes tracking a duration of time the user remains in the location.

10. The method of claim 8, further comprising:

reading, with the camera, one or more machine-readable non-repeating prints positioned on an article of clothing of a second user;

comparing the one or more machine-readable non-repeating prints with the database;

identifying, using the comparison, the second user wearing the article of clothing having the one or more machine-readable non-repeating prints;

tracking a location of the second user using the camera;

tracking a movement of the second user using the camera; and recording information relating to the location and movement of the second user at a computing device.

11. A method for modifying a virtual article of clothing based on user input, the method being implemented via execution of computing instructions configured to run at one or more processors and configured to be stored at non-transitory computer-readable media, the method comprising:

identifying a user of a customized clothing system;

recalling stored information relative to the user's body;

receiving an input from the user relative to the user's body;

modifying the stored information relative to the user's body based on the input;

generating a recommendation to the user to modify a virtual article of clothing based on the input, the recommendation including a recommended location on the virtual article of clothing based on the input; and positioning a non-repeating print on the virtual article of clothing at the recommended location.

12. The method of claim 11, wherein the input is received at an interface of a computing device.

* * * * *